United States Patent
Ostendorf

(10) Patent No.: US 12,187,854 B2
(45) Date of Patent: Jan. 7, 2025

(54) CROSSLINKABLE ORGANOSILOXANE COMPOSITIONS

(71) Applicant: WACKER CHEMIE AG, Munich (DE)

(72) Inventor: Detlev Ostendorf, Dresden (DE)

(73) Assignee: Wacker Chemie AG, Munich (DE)

( * ) Notice: Subject to any disclaimer, the term of this patent is extended or adjusted under 35 U.S.C. 154(b) by 987 days.

(21) Appl. No.: 17/268,109

(22) PCT Filed: Aug. 17, 2018

(86) PCT No.: PCT/EP2018/072353
§ 371 (c)(1),
(2) Date: Feb. 12, 2021

(87) PCT Pub. No.: WO2020/035149
PCT Pub. Date: Feb. 20, 2020

(65) Prior Publication Data
US 2021/0238366 A1 Aug. 5, 2021

(51) Int. Cl.
*C08G 77/00* (2006.01)
*C08G 77/12* (2006.01)
*C08G 77/20* (2006.01)

(52) U.S. Cl.
CPC ............ *C08G 77/80* (2013.01); *C08G 77/12* (2013.01); *C08G 77/20* (2013.01)

(58) Field of Classification Search
CPC ......... C08G 77/80; C08G 77/12; C08G 77/20
See application file for complete search history.

(56) References Cited

U.S. PATENT DOCUMENTS

| 3,438,936 | A | 4/1969 | Lamoreaux | |
| 2014/0377570 | A1* | 12/2014 | Hirai | C08G 77/20 428/447 |
| 2015/0087791 | A1* | 3/2015 | Kong | C08L 83/14 528/31 |
| 2016/0372641 | A1* | 12/2016 | Xing | H01L 33/56 |

FOREIGN PATENT DOCUMENTS

| EP | 0110370 A1 | 6/1984 |
| EP | 0252858 A1 | 1/1988 |
| JP | 2017193702 A2 | 10/2017 |
| WO | 12129766 A1 | 10/2012 |

OTHER PUBLICATIONS

Tsumura et al. (Polymer Journal. vol. 31, No. 5, pp. 452-457 (1999).*
"Synthesis and properties of crosslinked polycarbosilanes by hydrosilylation polymerization", Tsumura M et al., Polymer Journal, vol. 31, No. 5, pp. 452-457.
Zuev et al., "A Facile and Efficient Synthesis of Organocyclosiloxanes," Phosphorus, Sulfur, and Silicon, Jun. 2003, pp. 1289-1294, vol. 178, No. 6, Taylor and Francis, Inc. (DOI: 10.1080/10426500390200585).

* cited by examiner

*Primary Examiner* — Shane Fang
(74) *Attorney, Agent, or Firm* — BROOKS KUSHMAN P.C.

(57) ABSTRACT

A hydrosilylation curable mixture whose cured products have high mechanical damping include a cyclosiloxane bearing aliphatic unsaturation and a coupler having both silicon-bonded hydrogen and at least one aromatic group.

14 Claims, No Drawings

CROSSLINKABLE ORGANOSILOXANE COMPOSITIONS

CROSS REFERENCE TO RELATED APPLICATIONS

This application is the U.S. National Phase of PCT Appln. No. PCT/EP2018/072353 filed Aug. 17, 2018, the disclosure of which is incorporated in its entirety by reference herein.

BACKGROUND OF THE INVENTION

1. Field of the Invention

The invention relates to hydrosilylation-crosslinkable organosiloxane compositions, to processes for the production thereof and to the use thereof and vulcanizates obtainable therefrom.

2. Description of the Related Art

Organopolysiloxane resins containing reactive units having aliphatic carbon-carbon multiple bonds may be crosslinked with suitable couplers having two reactive SiH functions or with crosslinkers having at least three reactive SiH functions in the presence of, usually, platinum-containing catalysts, by a hydrosilylation/addition reaction. The advantage of vulcanized organopolysiloxane resins compared to organic systems, such as unsaturated polyester resins or epoxy resins, is their characteristic of combining high UV resistance and high heat resistance. Organopolysiloxane resins moreover have low dielectric constants and good stability toward chemicals. For these reasons, organopolysiloxane resins are used, for example, as a potting compound for the production of electrical or electronic components, particularly in the production of optical semiconductor elements such as high-performance LEDs (=Light Emitting Devices), and as an insulation material, for example in traction motors, for securing the windings and for filling the cavities between the turns, and also as a coating material. By using fibers, reinforcing fillers or modifiers, the mechanical properties, strength or fracture toughness can be optimized in order to expand the possible uses of addition-crosslinking organopolysiloxane resin compositions for applications in which higher demands on strength or durability are required. However, the vulcanized networks of organopolysiloxane resins are more brittle compared to organic systems, which can be attributed to a lower ductility, i.e. to low flow characteristics of the polymer network. The low flow characteristics and the consequent relatively low fracture toughness of the material are also identifiable in a compression test curve by a high value for the flow ratio. In addition, such brittle materials typically also exhibit an inhomogeneous polymer network and accordingly unfavorable damping characteristics identifiable in a tan delta measurement curve of a dynamic mechanical analysis (DMA) by a relatively high full width at half maximum and a relatively low height of the damping maximum tan $\delta_{max}$ at the glass transition temperature (Tg). A single narrow and tall tan delta peak (=high damping) by contrast indicates a relatively homogenous network which is generally observed in thermoplastic materials having a narrow molar weight distribution; however this is not customarily observed for a typical thermosetting material. Conversely, vulcanized networks of organopolysiloxane resins exhibiting more advantageous flow characteristics, i.e. a low value for the flow ratio, and accordingly higher fracture toughnesses tend to exhibit relatively low strengths, i.e. a low elastic modulus.

U.S. Pat. No. 3,438,936 describes, inter alia, the use of a cyclic siloxane $(ViMeSiO_{2/2})_4$ which is vulcanized with divalent SiH-containing couplers via an addition reaction in the presence of a platinum catalyst. The vulcanizates have good flow properties but low strengths, i.e. low elastic modulus values.

The present invention has for its object to provide addition crosslinkable organosiloxanes with which vulcanizates of high strength, i.e. a high elastic modulus, coupled with a high fracture toughness manifesting in a small value for the flow ratio and a high and narrow damping maximum tan $\delta_{max}$, are obtainable.

SUMMARY OF THE INVENTION

The invention provides hydrosilylation-crosslinkable compositions containing (A) cyclosiloxanes of formula

wherein

R represents methyl, n-butyl, tert-butyl, cyclohexyl, n-octyl, 2-ethylhexyl, 2,2,4-trimethylpentyl or 2,4,4-trimethylpentyl, $R^1$ represents vinyl, bicycloheptenyl, 3a,4,5,6,7,7a-hexahydro-4,7-methano-1H-indenyl or 2-propenyl, $R^2$ represents phenyl, o-, m- or p-tolyl or benzyl, a is 0 or 1, b is 0 or 1, c is 0, 1 or 2, and m is 3, 4 or 5, preferably 3 or 4, more preferably 3, with the proviso that a+b+c is 2, at least 3 radicals $R^1$ are present per siloxane molecule (A) and at least m-3 radicals $R^2$ are present per siloxane molecule (A), (B) organosilicon compounds having two Si-bonded hydrogen atoms and at least one aromatic radical and (C) a catalyst which promotes addition of Si-bonded hydrogen onto an aliphatic multiple bond.

Radical R is preferably methyl.

Radical $R^1$ is preferably vinyl.

Radical $R^2$ is preferably phenyl.

DETAILED DESCRIPTION OF THE PREFERRED EMBODIMENT

Component (A) is preferably a cyclotrisiloxane (A1) of formula (I) where m is 3, a=b=1 and c=0 or aromatic cyclosiloxanes (A2) of formula (I) where m is 3, 4 or 5, wherein per cyclosiloxane molecule (A2) at least 3 radicals $R^1$ are present and at least one unit where a=0 and b=c=1 is present.

The cyclosiloxanes (A2) of formula (I) are preferably those where m is 3 or 4, wherein in at least three of the m units a=0 and b=c=1, in particular cyclosiloxanes of formula (I) where m is 3, wherein in each of the m units a=0 and b=c=1.

Preferably at least m-2, more preferably m-1, and in particular, m radicals $R^2$ are present per siloxane molecule (A2), wherein m and $R^2$ are as defined above.

Examples of the cyclosiloxanes (A1) employed according to the invention are $(MeViSiO_{2/2})_3$, $(MeBchSiO_{2/2})_3$, $(MeDcpSiO_{2/2})_3$, wherein Me is methyl, Bch is bicycloheptenyl, Dcp is 3a,4,5,6,7,7a-hexahydro-4,7-methano-1H-indenyl and Vi is vinyl.

Examples of the cyclosiloxanes (A2) employed according to the invention are $(PhViSiO_{2/2})_5$, $(PhViSiO_{2/2})_4$, $(Ph(Bch)SiO_{2/2})_4$, $(Ph(Dcp)SiO_{2/2})_4$, $(PhViSiO_{2/2})_3$, $(Ph(Bch)SiO_{2/2})_3$, $(Ph(Dcp)SiO_{2/2})_3$, $(PhMeSiO_{2/2})_1(PhViSiO_{2/2})_3$, $(PhMeSiO_{2/2})_2(PhViSiO_{2/2})_3$, $(Ph_2SiO_{2/2})_1(PhViSiO_{2/2})_3$, $(MeViSiO_{2/2})_1(PhViSiO_{2/2})_3$, $(MeViSiO_{2/2})_2(PhViSiO_{2/2})_3$, $(MeViSiO_{2/2})_2(PhViSiO_{2/2})_3$, $(MeViSiO_{2/2})_1(PhViSiO_{2/2})_2$ and $(MeViSiO_{2/2})_3(PhMeSiO_{2/2})_1$, wherein Me is methyl, Vi is vinyl, Bch is bicycloheptenyl, Dcp is 3a,4,5,6,7,7a-hexahydro-4,7-methano-1H-indenyl and Ph is phenyl.

The cyclosiloxanes (A2) employed according to the invention are preferably $(Ph(Bch)SiO_{2/2})_4$, $(Ph(Dcp)SiO_{2/2})_4$, $(Ph(Bch)SiO_{2/2})_3$, $(Ph(Dcp)SiO_{2/2})_3$, $(PhViSiO_{2/2})_3$, $(PhViSiO_{2/2})_4$ or $(PhViSiO_{2/2})_5$, wherein $(PhViSiO_{2/2})_3$ or $(PhViSiO_{2/2})_4$ are most preferred, wherein Me is methyl, Vi is vinyl, Bch is bicycloheptenyl, Dcp is 3a,4,5,6,7,7a-hexahydro-4,7-methano-1H-indenyl and Ph is phenyl.

Component (A2) may be one type of aromatic cyclosiloxane or a mixture of different types of aromatic cyclosiloxanes, wherein mixtures are preferred, in particular mixtures of aromatic cyclosiloxanes of formula (I) where m is 3 or 4.

When the component (A2) employed according to the invention is a mixture of aromatic cyclosiloxanes of formula (I) where m is 3, 4 or 5, preferably 3 or 4, the sum of the aromatic cyclosiloxanes (A2) of formula (I) where m=3 or 4, based on the sum of all aromatic cyclosiloxanes (A2) of formula (I), is by preference at least 0.70, more preferably at least 0.80, yet more preferably at least 0.90, and in particular at least 0.95. It is preferable when the sum of the aromatic cyclosiloxanes (A2) of formula (I) where m=3, based on the sum of all aromatic cyclosiloxanes (A2) of formula (I), is at least 0.10, more preferably at least 0.20, yet more preferably at least 0.30, and in particular at least 0.40.

The cyclosiloxanes (A) are commercially available products or are producible by processes customary in chemistry, for example by hydrolysis and condensation of the corresponding dichlorosilanes, optionally in the presence of an auxiliary base; by reaction of the corresponding dichlorosilanes with "oxygen donors" such as alkali metal carbonates, alkali metal hydrogencarbonates, alkaline earth metal carbonates, alkaline earth metal hydrogencarbonates, metal oxides, such as zinc oxide, or alcohols, such as tert-butyl alcohol, optionally in the presence of an auxiliary base, for example pyridine, alkylamine, alkali metal hydroxide, alkali metal ethoxide, alkali metal methoxide, wherein the syntheses are typically carried out in commonly used solvents such as toluene, acetone, methyl ethyl ketone, ethyl acetate, diethyl ether, dibutyl ether, methyl tert-butyl ether, tetrahydrofuran, chloroform, pentane, hexane, heptane, Isopar™ E or tetrachloromethane; or by reaction of 1,1,3,3-substituted 1,3-dihydroxydisiloxanes with 1,1,3,3-substituted 1,3-dichlorodisiloxanes or substituted dichlorosilanes and an auxiliary base such as pyridine or alkylamine optionally in a solvent such as toluene.

The phenyl-containing cyclosiloxanes (A2) employed according to the invention are preferably produced as per the working examples as described in Zuev, V., Kalinin, A. V., Phosphorus Sulfur and Silicon, 178:1289-1294, 2003 (DOI: 10.1080/10426500390200585), for example by reaction of the corresponding dichlorosilanes with sodium hydrogencarbonate as the oxygen donor and pyridine as the auxiliary base in toluene, acetone, ethyl acetate or methyl ethyl ketone.

The component (B) employed according to the invention may be any desired and hitherto known organosilicon compounds comprising two Si-bonded hydrogen atoms and at least one aromatic radical, for example SiH-functional silanes and siloxanes.

Coupler (B) is preferably an organosilicon compound containing units of formula

$$R^4_e H_f R^5_g SiO_{(4-e-f-g)/2} \qquad (II),$$

wherein $R^4$ may be identical or different and represents a monovalent or divalent, SiC-bonded, optionally substituted, aliphatically saturated hydrocarbon radical, $R^5$ may be identical or different and represents a monovalent or divalent, SiC-bonded, optionally substituted, aliphatically saturated aromatic hydrocarbon radical, e is 0, 1, 2 or 3, preferably 0, 1 or 2, more preferably 1 or 2, f is 0, 1 or 2, preferably 1 or 2, and g is 0, 1 or 2, preferably 1 or 2, with the proviso that e+f+g is ≤4 and two Si-bonded hydrogen atoms and at least one aromatic radical are present per molecule.

Couplers (B) preferably contain per molecule 1 to 4, more preferably 1 to 2, radicals $R^5$.

Couplers (B) preferably contain per molecule at least one radical $R^5$ which is a divalent, SiC-bonded, aliphatically saturated aromatic hydrocarbon radical which in particular connects two units of formula (II) to one another.

Examples of radicals $R^4$ are alkyl radicals such as the methyl, ethyl, n-propyl, iso-propyl, 1-n-butyl, 2-n-butyl, iso-butyl, tert-butyl, n-pentyl, iso-pentyl, neo-pentyl, and tert-pentyl radicals; hexyl radicals such as the n-hexyl radical; heptyl radicals such as the n-heptyl radical; octyl radicals such as the n-octyl radical and iso-octyl radicals such as the 2,4,4-trimethylpentyl radical and the 2,2,4-trimethylpentyl radical; nonyl radicals such as the n-nonyl radical; decyl radicals such as the n-decyl radical; dodecyl radicals such as the n-dodecyl radical; hexadecyl radicals such as the n-hexadecyl radical; octadecyl radicals such as the n-octadecyl radical; cycloalkyl radicals such as the cyclopentyl, cyclohexyl, cycloheptyl and methylcyclohexyl radicals, and also the methylene, ethylene, dimethylmethylene and methylmethylene radicals, preferably the methyl radical.

Examples of radicals $R^5$ are aryl radicals such as the phenyl, biphenyl, naphthyl, anthryl and phenanthryl radicals; alkaryl radicals, such as o-, m-, p-tolyl radicals, xylyl radicals and ethylphenyl radicals; and aralkyl radicals such as the benzyl radical, the α- and the β-phenylethyl radical, the 2-(2-methylphenyl) ethyl radical, the 2-(3-methylphenyl)ethyl radical, 2-(4-methylphenyl)ethyl radical, the 2-phenylpropenyl radical and the 2-phenyl-isopropenyl radical, and also the phenylene radical, methyl(phenyl)methylene radical, phenylmethylene radical, diphenylmethylene radical, $-(C_6H_4)-CH_2-(C_6H_4)-$, $-(C_6H_4)-C(CH_3)_2-(C_6H_4)-$, $-(C_6H_4)-C(CH_3)H-(C_6H_4)-$, $-(C_6H_4)-C(C_6H_5)H-(C_6H_4)-$, $-(C_6H_4)-C(C_6H_5)Me-(C_6H_4)-$, $-(C_6H_4)-C(C_6H_5)_2-(C_6H_4)-$, $-(C_6H_4)-O-(C_6H_4)-$, $-(C_6H_4)-S-(C_6H_4)-$, and also divalent biphenyl, naphthalene, anthracene or phenanthrene radicals, wherein the phenyl radical, the divalent biphenyl radical or the phenylene radical are preferred.

Examples of couplers (B) are phenylsilanes, such as diphenylsilane (CAS 775-12-2), methyl(phenyl)silane (CAS 766-08-5); couplers having siloxane units such as 1,3-dimethyl-1,3-diphenyldisiloxane (CAS 6689-22-1), 1,1,3-trimethyl-3-phenyldisiloxane, 1,5-dimethyl-1,3,3,5-tetraphenyltrisiloxane, 1,1,3,3-tetraphenyldisiloxane, 1,1,5,5- tetramethyl-3,3-diphenyltrisiloxane, 1,1,3,5,5-pentamethyl-3-phenyltrisiloxane; couplers having phenylene and divalent biphenyl units such as 1,4-bis(dimethylsilyl)benzene (CAS 2488-01-9), 1,4-bis(methylphenylsilyl)benzene, 4,4'-bis(dimethylsilyl)-1,1'-biphenyl, bis(4'-(dimethylsilyl)-[1,1'-biphenyl]-4-yl)dimethylsilane, 4,4'-bis(methylphenylsilyl)-1,1'-biphenyl, bis(4-(dimethylsilyl)phenyl)dimethylsilane, bis(4-(dimethylsilyl)phenyl)(ethyl)methylsilane, bis(4-(dimethylsilyl)phenyl)diethylsilane, bis(4-(dimethylsilyl)phenyl)di-n-butylsilane, bis(4-(dimethylsilyl)phenyl)di-tert-butylsilane, bis(4-(dimethylsilyl)phenyl)dipropylsilane, bis(4-(dimethylsilyl)phenyl) di-iso-propylsilane, bis(4-(dimethylsilyl)phenyl)methane, 2,2-bis(4-(dimethylsilyl)phenyl)propane; couplers comprising divalent polycyclic aromatic hydrocarbons such as 9,10-bis(dimethylsilyl)anthracene, 1,4-bis(dimethylsilyl)naphthalene, 1,5-bis(dimethylsilyl)naphthalene, 2,6-bis(dimethylsilyl)naphthalene, 1,8-bis(dimethylsilyl)naphthalene, 1,6-bis(dimethylsilyl)naphthalene, 1,7-bis(dimethylsilyl)naphthalene; and bis(4-(dimethylsilyl)phenyl) ether and bis(4-(dimethylsilyl)phenyl)sulfide.

Coupler (B) employed according to the invention is preferably an organosilicon compound such as diphenylsilane, 1,3-dimethyl-1,3-diphenyl-disiloxane, 1,1,5,5-tetramethyl-3,3-diphenyltrisiloxane, 1,4-bis(dimethylsilyl)benzene, 4,4'-bis(dimethylsilyl)-1,1'-biphenyl, bis(4'-(dimethylsilyl)-[1,1'-biphenyl]-4-yl)dimethylsilane, bis(4-(dimethylsilyl)phenyl)dimethylsilane, bis(4-(dimethylsilyl)phenyl)methane, bis(4-(dimethylsilyl)phenyl) ether, or bis(4-(dimethylsilyl)phenyl)sulfide.

Coupler (B) employed according to the invention is more preferably diphenylsilane, 1,4-bis(dimethylsilyl)benzene, 1,3-dimethyl-1,3-diphenyl-disiloxane, 4,4'-bis(dimethylsilyl)-1,1'-biphenyl or bis(4-(dimethylsilyl)phenyl)dimethylsilane, especially 1,4-bis(dimethylsilyl)benzene, 4,4'-bis(dimethylsilyl)-1,1'-biphenyl, 1,3-dimethyl-1,3-diphenyldisiloxane or bis(4-dimethylsilyl)phenyl)dimethylsilane.

Couplers (B) are commercially available products or they may be produced by processes commonly used in chemistry, for example by Grignard reaction.

In the compositions according to the invention components (A) and (B) are employed in amounts such that the molar ratio of Si-bonded hydrogen to aliphatically unsaturated carbon-carbon multiple bonds is by preference 0.80 to 1.20, more preferably 0.85 to 1.10, yet more preferably 0.90 to 1.10, and in particular 0.95 to 1.05.

Employable catalysts (C) include all catalysts that are useful for addition of Si-bonded hydrogen onto aliphatic multiple bonds.

Examples of catalysts (C) are metals such as platinum, rhodium, palladium, ruthenium and iridium, preferably platinum, which may optionally be fixed on finely divided support materials such as activated carbon, aluminum oxide or silicon dioxide.

Preferably employed catalysts (C) are platinum and compounds and complexes thereof.

Examples of such platinum catalysts (C) are metallic and finely divided platinum, which may be arranged on supports such as silicon dioxide, aluminum oxide or activated carbon, compounds or complexes of platinum, such as platinum halides, for example $PtCl_4$, $H_2PtCl_6 \cdot 6H_2O$, $Na_2PtCl_4 \cdot 4H_2O$, platinum-olefin complexes, platinum-alcohol complexes, platinum-alkoxide complexes, platinum-ether complexes, platinum-aldehyde complexes, platinum-ketone complexes, including reaction products of $H_2PtCl_6 \cdot 6H_2O$ and cyclohexanone, platinum-vinylsiloxane complexes, in particular platinum-divinyltetramethyldisiloxane complexes with or without a content of detectable inorganically bonded halogen, bis(gamma-picoline)platinum dichloride, trimethylenedipyridineplatinum dichloride, dicyclopentadieneplatinum dichloride, dimethylsulfoxidethyleneplatininum(II) dichloride and also reaction products of platinum tetrachloride with olefin and primary amine or secondary amine or primary and secondary amine, such as the reaction product of platinum tetrachloride dissolved in 1-octene with sec-butylamine, or ammonium-platinum complexes according to EP-B 110 370 and platinum complexes with N-heterocyclic carbenes (NHC) such as [1,3-bis(2,6-diisopropylphenyl)imidazol-2-ylidene][1,3-divinyl-1,1,3,3-tetramethyldisiloxane]platinum(0) (CAS 849830-54-2), [1,3-bis(2,6-diisopropylphenyl)imidazolidinylidene][1,3-divinyl-1,1,3,3-tetramethyldisiloxane]platinum(0) (CAS 873311-51-4), [1,3-bis(cyclohexyl)imidazol-2-ylidene][1,3-divinyl-1,1,3,3-tetramethyldisiloxane]platinum(0) (CAS 400758-55-6), 1,3-bis(2,4,6-trimethylphenyl)-3,4,5,6-tetrahydropyrimidin-1-iumplatinum(divinyltetramethyldisiloxane), 1,3-bis(2,6-dimethylphenyl)-3,4,5,6-tetrahydropyrimidin-1-iumplatinum(divinyltetramethyldisiloxane) and 1,3-bis(2-methylphenyl)-3,4,5,6-tetrahydropyrimidin-1-iumplatinum(divinyltetramethyldisiloxane).

Preferably employed as catalyst (C) is the platinum-1,3-divinyl-1,1,3,3-tetramethyldisiloxane complex (CAS 68478-92-2) which has long been known as "Karstedt's catalyst" in the literature.

Catalyst (C) is employed in the preparations according to the invention by preference in amounts of 1 to 5000 ppm by weight (parts by weight per million parts by weight), more preferably in amounts of 1 to 2000 ppm by weight, and in particular in amounts of 1 to 500 ppm by weight, in each case calculated as elemental metal, preferably elemental platinum, and based on the total weight of the components (A) and (B).

As catalyst (C) the preparations according to the invention most preferably employ Karstedt's catalyst (CAS 68478-92-2) in amounts of 5 to 100 ppm by weight, calculated as elemental platinum and based on the total weight of the components (A) and (B).

In a preferred embodiment catalyst (C) is used in admixture with an inhibitor (D).

In addition to the components (A), (B) and (C) the compositions according to the invention may contain further substances distinct from components (A), (B) and (C), such as for example inhibitors (D), additives (E) and solvents (F).

The compositions according to the invention may contain inhibitors (D), including those which have also hitherto been used in hydrosilylation-crosslinkable compositions and which retard the addition of Si-bonded hydrogen onto aliphatic carbon-carbon multiple bonds at room temperature, or which may be used to specifically adjust the processing time and crosslinking rate.

Examples of optionally employed inhibitors (D) are acetylenic alcohols, such as 1-ethynylcyclohexan-1-ol, 3,5-dimethyl-1-hexyn-3-ol, 2-phenyl-3-butyn-2-ol and 2-methyl-3-butyn-2-ol, linear vinyl-terminated polydimethylsiloxanes, trialkylcyanurates, maleates, such as diallyl maleate, dimethyl maleate and bis(2-methoxy-1-methylethyl)maleate, alkyl fumarates, such as diethyl fumarate and diallyl fumarate, organic hydroperoxides, such as cumene hydroperoxide, tert-butyl hydroperoxide and pinane hydroperoxide, organic peroxides, organic sulfoxides, organic amines and amides, phosphines and phosphites, phosphonites, phosphinites, nitriles, diaziridines and oximes and also alkylthioureas, thiuram monosulfides and disulfides.

The optionally employed inhibitors (D) are preferably 1-ethynylcyclohexan-1-ol or thiuram monosulfides, more preferably thiuram monosulfides.

When inhibitor (D) is employed it is preferably employed in amounts of 5 to 5000 ppm by weight, more preferably of 10 to 2000 ppm by weight, and in particular of 20 to 1000 ppm by weight, in each case based on the total weight of the components (A) and (B). The compositions according to the invention preferably contain inhibitor (D).

The addition-crosslinking composition according to the invention may be adjusted such that after combining all of the individual components forming said composition at temperatures of −50° C. to 30° C. it is storage stable over relatively long periods, in particular several weeks to at least 2 months, preferably up to at least 3 months, more preferably up to at least 4 months, and in particular up to at least 5 months.

It is likewise possible to adjust the preparations according to the invention such that after combining all of the components forming said preparations, only a limited working time (pot life) until onset of curing remains. This is achieved either by adding no inhibitor (D) or by employing for example 1-ethynylcyclohexan-1-ol, 2-methyl-3-butyn-2-ol, 3-methyl-1-pentyn-3-ol, 2,5-dimethyl-3-hexyn-2,5-diol, 2,5-dimethyl-1-hexyn-3-ol or 3,7-dimethyloct-1-yn-6-en-3-ol which have a less pronounced inhibiting effect on the addition reaction, wherein this list of inhibitors is to be understood as being merely exemplary and not limiting.

Components (E) optionally employed according to the invention are preferably plasticizers, adhesion promoters, soluble dyes, inorganic and organic pigments, fluorescent dyes, fungicides, fragrances, dispersing agents, rheological additives, corrosion inhibitors, oxidation inhibitors, light stabilizers, heat stabilizers, flame-retarding agents, agents for influencing tack, agents for influencing electrical properties, agents for improving thermal conductivity; modifies for increasing strength, glass transition temperature and/or fracture toughness; reinforcing and non-reinforcing fillers; and also fiber fabrics made of glass, carbon or plastic; or combinations thereof.

When the compositions according to the invention contain component (E) the amounts employed are in each case preferably 0.1 to 200 parts by weight, more preferably 0.1 to 100 parts by weight, and in particular 0.1 to 50 parts by weight, in each case based on 100 parts by weight of the sum of the components (A) and (B). The compositions according to the invention preferably contain no component (E).

Examples of optionally employed solvents (F) are ketones such as methyl isobutyl ketone, methyl ethyl ketone, methyl isoamyl ketone, diisobutyl ketone, acetone, cyclohexanone, diethyl ketone, 2-hexanone, acetylacetone and butane-2,3-dione; esters such as ethyl acetate, ethylene glycol diacetate, gamma-butyrolactone, 2-methoxypropyl acetate (MPA), di(propylene glycol) dibenzoate and ethyl(ethoxy) propionate, methyl acetoacetate, ethyl acetoacetate, n-butyl acetoacetate, methyl acetate, n-, sec- or tert-butyl acetate, butyl 2-hydroxypropionate, ethyl propionate, ethyl 2-hydroxypropionate and dimethyl maleate; amides such as N,N-dimethylformamide, N,N-dimethylacetamide, N-methyl-2-pyrrolidone and N-ethyl-2-pyrrolidone; nitriles such as acetonitrile, propionitrile, 3-methoxypropionitrile; acetals such as methylal, ethylhexylal, butylal, 1,3-dioxolane, 1,3,5-trioxane and glycerol formal; ethers such as methyl tert-butyl ether, tetrahydrofuran (THF), diphenyl ether, allylphenyl ether, benzylphenyl ether, cyclohexylphenyl ether, methylphenyl ether, tetrahydropyran, 4-methyltetrahydropyran, butylphenyl ether, dibenzyl ether, anisole, 2-methyltetrahyrofuran, cyclopentyl methyl ether, dibutyl ether, diethyl ether, di-, tri- or tetraethylene glycol dimethyl ether, ethylene glycol dibutyl ether, ethyl methyl ether and 1,4-dioxane; sulfoxides such as dimethyl sulfoxide, dipropyl sulfoxide and dibutyl sulfoxide; saturated hydrocarbons such as n-pentane, n-hexane, cyclohexane, n-heptane, n-octane and isomeric octanes such as 2-ethylhexane, 2,4,4-trimethylpentane, 2,2,4-trimethylpentane and 2-methylheptane, and also mixtures of saturated hydrocarbons having boiling ranges between 60-300° C., such as are obtainable under the trade names Exxsol™, Isopar™, Hydroseal® or Shellsol®; aromatic hydrocarbons such as benzene, toluene, o-, m- or p-xylene, solvent naphtha and mesitylene; acetals such as methylal, ethylhexylal, butylal, 1,3-dioxolane and glycerol formal; carbonates such as 1,3-dioxolan-2-one, diethyl carbonate, dimethyl carbonate, dipropyl carbonate, propylene glycol carbonate and ethylene carbonate; chloroform; dichloromethane and mixtures thereof.

Preferred optionally employed solvents (F) are aromatic solvents or saturated hydrocarbons.

When the compositions according to the invention contain solvent (F) the amounts employed are preferably 0.001 to 20 parts by weight, more preferably 0.01 to 10 parts by weight, and in particular 0.01 to 5 parts by weight, in each case based on 100 parts by weight of the sum of the components (A) and (B). The compositions according to the invention preferably contain no solvent (F).

As a consequence of production the synthesis of cyclosiloxane (A) may also result in the formation of byproducts which do not correspond to the component (A) employed according to the invention. The synthesis of component (A) may also result for example in the formation of linear, i.e. open-chain, siloxanes which bear silanol groups and/or alkoxy groups on the terminal siloxane units. If by-products are formed during the production of components (A) these are preferably not separated but rather are present in admixture with cyclosiloxanes (A).

The compositions according to the invention are by preference those containing
(A1) cyclotrisiloxanes,
(B) coupler,
(C) catalyst,
optionally (D) inhibitor,
optionally (E) additives and
optionally (F) solvent.

The compositions according to the invention are preferably those containing
(A1) cyclotrisiloxanes,
(B) couplers having at least one radical $R^5$ which is a divalent, SiC-bonded, optionally substituted aliphatically saturated aromatic hydrocarbon radical which connects two units of formula (II) to one another,
(C) catalyst,
(D) inhibitor,
optionally (E) additives and
optionally (F) solvent.

In a further preferred embodiment the compositions according to the invention are those containing
(A2) aromatic cyclosiloxanes,
(B) coupler,
(C) catalyst,
optionally (D) inhibitor,
optionally (E) further constituents and
optionally (F) solvent.

In a further particularly preferred embodiment the compositions according to the invention are those containing
(A2) aromatic cyclosiloxanes,
(B) couplers having at least one radical $R^5$ which is a divalent, SiC-bonded, optionally substituted aliphatically saturated aromatic hydrocarbon radical which connects two units of formula (II) to one another,
(C) catalyst,
(D) inhibitor,
optionally (E) further constituents and
optionally (F) solvent.

In addition to the components (A), (B), (C), the optionally employed components (D) to (F) and the byproducts that may be formed in the production of the component (A), the compositions according to the invention preferably contain no further constituents.

The components employed according to the invention may in each case be a single type of such a component or a mixture of at least two types of a respective component.

The compositions according to the invention may be solid or liquid at 23° C. and 1013 hPa, preferably liquid at 23° C. and 1013 hPa.

When the compositions according to the invention are liquid at 23° C. and 1013 hPa, they preferably have a dynamic viscosity of 1 to 100,000 mPa·s, more preferably of 10 to 50,000 mPa·s, and in particular of 100 to 10,000 mPa·s, in each case at 23° C.

Production of the compositions according to the invention may be carried out according to known processes such as for example by mixing the individual components in any desired sequence and in hitherto known fashion.

The present invention further provides a process for producing the compositions according to the invention by mixing the individual components.

In the process according to the invention the mixing may be carried out at temperatures preferably in the range from 10° C. to 40° C. However, if desired the mixing may also be carried out at higher temperatures, for example at temperatures in the range from 40° C. to 100° C., wherein an inhibitor (D) is preferably added to the composition. It is preferable to perform mixing at the temperature which results upon mixing at ambient temperature from the temperature of the raw materials plus the temperature increase due to the energy input during mixing, wherein heating or cooling may be performed as required.

The mixing may be carried out at ambient atmospheric pressure, i.e. about 900 to 1100 hPa. It is further possible to perform mixing temporarily or continuously under reduced pressure, such as for example at 30 to 500 hPa absolute pressure, to remove volatile compounds and/or air or to work at elevated pressure, such as pressures between 1100 hPa and 3000 hPa absolute pressure, in particular in continuous mode, when for example these pressures are brought about in closed systems by the pressure during pumping and by the vapor pressure of the employed materials at elevated temperatures.

The process according to the invention may be performed continuously, discontinuously or semicontinuously, preferably discontinuously.

In a preferred embodiment of the process according to the invention for producing the compositions according to the invention the constituents (A), (B) and (C) and the optionally employed components (D), (E) and (F) are mixed in any desired sequence.

It is particularly preferable when the process according to the invention comprises premixing the components (A) and (B) and the optionally employed components (D), (E) and (F) in any desired sequence and then adding component (C), optionally as a mixture with component (F).

In a further particularly preferred embodiment the process according to the invention comprises premixing the components (A) and (B) and the optionally employed components (E) and (F) in any desired sequence and then adding a mixture of components (C) and (D), optionally as a mixture with component (F).

In a further particularly preferred embodiment the process according to the invention comprises premixing the component (A) and the optionally employed components (E) and (F) in any desired sequence and then adding a mixture of components (B) and (C), optionally employed component (D) and optionally employed component (F).

The mixtures according to the invention/produced according to the invention are preferably degassed before curing.

The crosslinking according to the invention is preferably carried out at temperatures in the range from 50° C. to 270° C., more preferably from 70° C. to 200° C., and especially from 140° C. to 200° C. The crosslinking according to the invention is most preferably carried out initially at temperatures of 100° C. to 200° C. followed by a post-curing step at 210° C. to 270° C.

The crosslinking according to the invention is preferably carried out at ambient atmospheric pressure, i.e. about 900 to 1100 hPa, but may also be carried out at elevated pressure, i.e. from 1200 hPa to 10 MPa.

The crosslinking according to the invention may take place in an air atmosphere or protective gas atmosphere, such as nitrogen or argon. The crosslinking according to the invention preferably takes place at temperatures up to 220° C. in an air atmosphere and at temperatures above 220° C. in a protective gas atmosphere.

The present invention further provides molded articles produced by crosslinking the compositions according to the invention.

The molded articles according to the invention preferably have an elastic modulus measured at 23° C. of more than 0.70 GPa, more preferably more than 0.80 GPa, yet more preferably more than 1.00 GPa, and in particular more than 1.40 GPa.

The molded articles according to the invention preferably have a flexural strength am measured at 23° C. of more than 20 MPa, more preferably more than 30 MPa, yet more preferably more than 40 MPa, and especially more than 50 MPa.

The molded articles according to the invention by preference have a tan delta$_{max}$ of at least 0.400, more preferably of at least 0.500, yet more preferably of at least 0.600, and especially of at least 0.700.

The molded articles according to the invention by preference have a full width at half maximum, defined as the peak width at tan delta$_{max}$/2, of ≤30° C., more preferably ≤25° C., most preferably ≤20° C.

In compressive testing, measured at 25° C., the molded articles according to the invention preferably have a yield stress ay, defined as the stress at which for the first time an increase in compression is not accompanied by an increase in stress (see DIN EN ISO 604:2003-12, Chapter 3.3.1) and identifiable by a stress maximum in the stress/compressive strain curve (see DIN EN ISO 604:2003-12, Chapter 4, Figure 1, curve a) followed by a drop in stress for further increase in compression after σy (strain softening).

The molded articles according to the invention by preference have a flow ratio measured at 25° C. of less than 1.30, more preferably less than 1.25, yet more preferably less than 1.20, and especially less than 1.15.

The molded articles according to the invention have the advantage that they combine high strengths, i.e. high elastic moduli and flexural strength values, with good flow characteristics, i.e. a low flow ratio $\sigma_{20\%}{:}\sigma y$, and a homogeneous network structure, identifiable by a high damping maximum tan delta$_{max}$ at the glass transition temperature (Tg) and a low full width at half maximum.

The compositions according to the invention have the advantage that they are liquid and readily processable at a temperature of 23° C.

The compositions according to the invention have the advantage that they are producible from readily available substances by commonly used processes.

The compositions according to the invention have the advantage that they are liquid and readily processable at a temperature of 23° C.

The process according to the invention has the advantage that it is easy to perform.

Viscosity Measurement

In the context of the present invention the dynamic viscosity according to DIN 53019 is determined at a temperature, unless otherwise stated, of 23° C. and an air pressure of 1013 hPa. Measurement is performed with an Anton Paar "Physica MCR 300" rotational rheometer. Here, for viscosities of 1 to 200 mPa·s a coaxial cylinder measurement system (CC 27) having a ring measurement slot of 1.13 mm is utilized while a cone-plate measurement system (Searle-System with CP 50-1 measuring cone) is used for viscosities of greater than 200 mPa·s. The shear rate is adapted to the polymer viscosity (1 to 99 mPa·s at 100 s$^{-1}$; 100 to 999 mPa·s at 200 s$^{-1}$; 1000 to 2999 mPa·s at 120 s$^{-1}$; 3000 to 4999 mPa·s at 80 s$^{-1}$; 5000 to 9999 mPa·s at 62 s$^{-1}$; 10,000 to 12,499 mPa·s at 50 s$^{-1}$; 12,500 to 15,999 mPa·s at 38.5 s$^{-1}$; 16,000 to 19,999 mPa·s at 33 s$^{-1}$; 20,000 to 24,999 mPa·s at 25 s$^{-1}$; 25,000 to 29,999 mPa·s at 20 s$^{-1}$; 30,000 to 39,999 mPa·s at 17 s$^{-1}$; 40,000 to 59,999 mPa·s at 10 s$^{-1}$; 60,000 to 149,999 at 5 s$^{-1}$; 150,000 to 199,999 mPa·s at 3.3 s$^{-1}$; 200,000 to 299,999 mPa·s at 2.5 s$^{-1}$; 300,000 to 1,000,000 mPa·s at 1.5 s$^{-1}$.

After temperature-controlling the measurement system to the measurement temperature, a three-stage measurement program consisting of a run-in phase, a pre-shearing and a viscosity measurement is employed. The run-in phase is carried out by stepwise increasing of the shear rate over one minute to the abovementioned shear rate which is dependent on the expected viscosity at which the measurement is to be carried out. As soon as this has been achieved, the pre-shearing is carried out at constant shear rate for 30 s before the viscosity is determined from 25 individual measurements of 4.8 seconds each from which the average value is determined. The average value corresponds to the dynamic viscosity which is reported in mPa·s.

Production of the Cylindrical Test Specimens

To perform the DMA, the flexural strength measurements and compressive testing measurements, the test specimens were produced from cylindrical vulcanizates. The cylindrical vulcanizates were produced in stainless steel tubes having the dimensions length×internal diameter=150 mm×10 mm which were onesidedly sealed with a screwtop cap made of stainless steel. To prevent adhesion of the cyclosiloxane compositions, the inside of the screwtop contained a late seal made of polytetrafluoroethylene; the inner surfaces of the stainless steel tubes were sparingly wetted with WACKER® SILICONE PASTE P using an appropriately sized test tube brush before filling with the siloxane compositions, and the tubes were subsequently stored at 180° C. for 2 hours. The tubes were then filled with the cyclosiloxane composition and cured in a recirculating air oven in a nitrogen atmosphere for 72 hours at 180° C. and then for a further 2 hours at 250° C. The stainless steel tubes were stood upright with the open side pointing upward. The test specimens were then allowed to cool to 23° C. in the tubes before the test specimens were demolded. The uppermost 20 mm of the test specimen side which was uncovered during curing was discarded from further use.

Dynamic Mechanical Analysis (DMA)

Measurement Parameters:
  Instrument: ARES-Rheometer (TA-Instruments)
  Temperature range: −100° C.-300° C.
  Heating rate: 4 K/min with nitrogen purge
  Frequency: 1 Hz
  Strain: Initially 0.03%, automatically increased if measurement signal below threshold value For the investigations rectangular test specimens having the dimensions length×width×height=40 mm×6 mm×3 mm were produced from the cylindrical test specimens; the resulting clamping length was 25 mm.

In the present invention tan delta corresponds to the damping, i.e. the tangent of the phase angle or the ratio of loss modulus G" to storage modulus G'; tan delta$_{max}$ is defined as the damping maximum tan delta (=maximum value of the tangent delta curve) at the glass transition temperature Tg.

In the present invention the full width at half maximum is defined as the peak width of the tan delta curve in ° C. at tan delta$_{max}$/2.

The value for tan delta$_{max}$ reported in Table 1 was rounded to the third decimal place and the value for the full width at half maximum was rounded to the nearest integer, in each case according to DIN 1333:1992-02 section 4.

Compression Test

In the context of the present invention the compression properties (yield stress) were carried out according to the standard DIN EN ISO 604:2003-12.

Measurement Parameters:
  Instrument: Instron 3369 testing system
  Load cell: 50 kN
  Compression piston 50 mm,
  Test speed: 1 mm/min
  Temperature: 25° C., 28% rel. hum.
  Initial load: 40 N
  Lubricant: none Sample preparation: For the investigations cylindrical test specimens having a diameter of 9.5 mm and having a height of 17 mm were produced. The compression test was performed on 3 test specimens of a sample body. The sample bodies were compressed to about 4.5 mm compression, i.e. about 26% based on initial height, and underwent practically ideal barrel-shaped (bulbous) deformation until completion of the measurement. The flow ratio, defined as the quotient of the compressive stress σ in MPa at 20% compression and the yield stress σ$_y$ (see DIN EN ISO 604:2003-12, Chapter 3.3.1), was used to assess the material flow characteristics. The value for the flow ratio reported in Table 1 corresponds to the respective average value of the three individual measurements rounded to the second decimal place according to DIN 1333:1992-02 Section 4.

Flexural Strength

In the present invention the flexural strength and the flexural elastic modulus were measured according to ISO 178:2011-04 Method A with a test speed of 5 mm/min at a support distance L of 60 mm. The measurements were performed at 23° C. and 50% relative humidity. The preferred procedure was as follows: Cylindrical test specimens having the dimensions length×diameter=100 mm×9.5 mm were used. The measurements were performed on 5 test specimens in each case. The flexural strength $\sigma_{fM}$ (maximum flexural stress borne by the test specimen during the test (see ISO 178:2011-04, page 6, chapter 3.4)) was calculated according to the equation $$\sigma_{fm} = \frac{6 \times L \times \sigma_f}{\pi \times \emptyset^3},$$

wherein L is the support distance of 60 mm, $\sigma_f$ is the measured flexural stress in Newtons and $\emptyset$ is the test specimen diameter in mm. The flexural elastic modulus $E_f$ was calculated according to the equation $$E_f = \frac{L^3 \times (\sigma_{f2} - \sigma_{f1})}{0.15 \text{ mm} \times \pi \times \emptyset^4},$$

wherein L is the support distance of 60 mm, $\sigma_{f1}$ is the measured flexural stress at 0.10 mm deflection in kilonewtons (kN), $\sigma_{f2}$ is the measured flexural stress at 0.25 mm deflection in kilonewtons (kN) and $\emptyset$ is the test specimen diameter in mm. The value reported in Table 1 for the flexural strength om in MPa and the flexural elastic modulus $E_f$ in GPa corresponds to the respective average value of the individual measurements, rounded to the nearest integer (flexural elastic modulus) or to one decimal place (flexural strength) according to DIN 1333:1992-02 section 4.

Molar Masses

In the context of the present invention the number-average molecular weight Mn and the weight-average molecular weight Mw, in each case in units of g/mol and rounded to the nearest ten according to DIN 1333:1992-02 section 4, are determined by size exclusion chromatography (SEC/GPC) according to DIN 55672-1/ISO 160414-1 and ISO 160414-3 by calibration against polystyrene standards of a column assembly based on polystyrene-co-divinylbenzene as the stationary phase and composed of three columns having different pore size distributions in the sequence 10,000 Å, 500 Å and 100 Å with an exclusion size of greater than 450,000 g/mol. Phenyl-containing components are determined with a THF eluent and non-phenyl-containing components are determined with a toluene eluent. The analyses are carried out at a column temperature of 45±1° C. using a refractive index detector.

In the examples which follow all figures of parts and percentages are by weight unless otherwise stated. Unless otherwise stated, the examples which follow are performed at ambient atmospheric pressure, i.e. at about 1013 hPa, and at room temperature, i.e. about 23° C. or at a temperature attained on combining the reactants at room temperature without additional heating or cooling.

In the following
Me represents methyl, Vi represents vinyl, Et represents ethyl, Ph represents phenyl.

Example 1

Cyclics Mixture 1

52.92 g (630 mmol) of anhydrous sodium hydrogencarbonate (commercially available from Sigma-Aldrich Chemie GmbH, D-Steinheim) and 49.84 g (630 mmol) of anhydrous pyridine (commercially available from Sigma-Aldrich Chemie GmbH, D-Steinheim) in 250 ml of dry acetone (0.01% water; commercially available from VWR International GmbH, D-Darmstadt) were initially charged under a nitrogen atmosphere. Then 128.00 g (630 mmol) of vinylphenyldichlorosilane (commercially available from Gelest, Inc., 11 East Steel Rd., Morrisville, Pa. 19067) dissolved in 190 ml of dry acetone were added dropwise over 1 hour and the mixture was then stirred for 3 hours at room temperature. The mixture was subsequently filtered and the solid residue washed with 180 ml of dry acetone. The solvent and volatile components were removed from the combined filtrates at 80° C. and 1 mbar and the oily residue was filtered again. 88.6 g of a colorless oil (cyclics mixture 1) were obtained which according to $^{29}$Si NMR analysis contained 55 mol % of $(PhViSiO_{2/2})_3$ and 26 mol % of $(PhViSiO_{2/2})_4$ and also 19 mol % of linear siloxanes having the average composition $(PhViSiO_{2/2})_{7.5}(PhVi(OH)SiO_{1/2})_2$.

50.00 g of the cyclics mixture 1 produced hereinabove were mixed with 34.40 g of 1,4-bis(dimethylsilyl)benzene (CAS 2488-01-9; commercially available from abcr GmbH, D-Karlsruhe) in a Speedmixer™ DAC 150 FVZ from Hauschild & Co. KG for 10 seconds at 3000 rpm, then 0.05 g of platinum catalyst (commercially available under the name WACKER® CATALYST OL from Wacker Chemie AG, D-Munich) were added to the mixture; the mixture was mixed in the Speedmixer™ DAC 150 FVZ for 30 seconds at 3000 rpm, poured into the stainless steel cylinder molds and cured, and then examined. The results of the measurements are summarized in Table 1.

Example 2

The procedure described in Example 1 was repeated with the modification that instead of the cyclics mixture 1 50.0 g of 1,3,5-trimethyl-1,3,5-trivinylcyclotrisiloxane (CAS 3901-77-7; commercially available from abcr GmbH, D-Karlsruhe) and 59.23 g of 1,4-bis(dimethylsilyl)benzene were employed. The results of the measurements are summarized in Table 1.

Example 3

The procedure described in Example 1 was repeated with the modification that instead of 34.4 g of 1,4-bis(dimethylsilyl)benzene 47.76 g of 4,4'-bis(dimethylsilyl)biphenyl were employed. The results of the measurements are summarized in Table 1.

Comparative Example 1 (C1)

The procedure described in Example 1 was repeated with the modification that instead of the cyclics mixture 1, 50.0 g of 1,3,5,7-tetramethyl-1,3,5,7-tetravinylcyclotetrasiloxane (CAS 2554-06-5; commercially available from abcr GmbH, D-Karlsruhe) and 59.23 g of 1,4-bis(dimethylsilyl)benzene were employed. The results of the measurements are summarized in Table 1.

TABLE 1

| | Example | | | |
|---|---|---|---|---|
| | 1 | 2 | 3 | C1 |
| Flexural elastic modulus at 23° C. [GPa] | 1.5 | 1.1 | 1.5 | 0.9 |
| Flexural strength $\sigma_{fM}$ at 23° C. [MPa] | 61 | 46 | 82 | 40 |
| tan delta$_{max}$ | 0.879 | 1.386 | 0.757 | 0.746 |

TABLE 1-continued

| | Example | | | |
|---|---|---|---|---|
| | 1 | 2 | 3 | C1 |
| Full width at half maximum [° C.] | 14 | 9 | 24 | 12 |
| Flow ratio $\sigma_{20\%}:\sigma_y$ at 25° C. | 1.09 | 0.78 | 1.14 | 1.02 |

The invention claimed is:

1. A hydrosilylation-crosslinkable composition, comprising:
(A) one or more cyclosiloxanes of formula $$[R_aR^1_bR^2_cSiO_{2/2}]_m \quad (I)$$

wherein
R each individually represents methyl, n-butyl, tert-butyl, cyclohexyl, n-octyl, 2-ethylhexyl, 2,2,4-trimethylpentyl or 2,4,4-trimethylpentyl,
$R^1$ each individually represents vinyl, bicycloheptenyl, 3a,4,5,6,7,7a-hexahydro-4,7-methano-1H-indenyl or 2-propenyl,
$R^2$ each individually represents phenyl, o-, m- or p-tolyl or benzyl,
a is 0 or 1,
b is 0 or 1,
c is 0, 1 or 2, and
m is 3, 4 or 5,
with the proviso that
a+b+c is 2, at least 3 radicals $R^1$ are present per siloxane molecule (A) and at least m-3 radicals $R^2$ are present per siloxane molecule (A),
(B) at least one organosilicon compound coupler having two Si-bonded hydrogen atoms and at least one aromatic radical, selected from the group consisting of organosilicon compounds having units of formula $$R^4_eH_fR^5_gSiO_{(4-f-g)/2} \quad (II)$$

wherein
$R^4$ each may be identical or different and represents a monovalent or divalent, SiC-bonded, optionally substituted, aliphatically saturated hydrocarbon radical,
$R^5$ each may be identical or different and represents a monovalent or divalent, SiC-bonded, optionally substituted, aliphatically saturated aromatic hydrocarbon radical,
e is 0, 1, 2 or 3,
f is 0, 1 or 2 and
g is 0, 1 or 2,
with the proviso that e+f+g is ≤4 and two Si-bonded hydrogen atoms and at least one aromatic radical are present per molecule, and
(C) a least one catalyst which promotes addition of Si-bonded hydrogen onto an aliphatic multiple bond, wherein one component (A) is an aromatic cyclosiloxane (A2) of formula (I) where m is 3, 4 or 5, wherein per cyclosiloxane molecule (A2) at least 3 radicals $R^1$ are present and at least one unit where a=0 and b=c=1 is present.

2. The composition of claim 1, wherein component (A) is a cyclosiloxane (A2) of formula (I) where m is 3 or 4, and wherein in at least three of the m units a=0 and b=c=1.

3. The composition of claim 1, wherein one component (A) is an aromatic cyclosiloxane (A2) of formula (I) where m is 3, 4 or 5, wherein per cyclosiloxane molecule (A2) at least 3 radicals $R^1$ are present and at least one unit where a=0 and b=c=1 is present.

4. The composition of claim 3, wherein component (A) is $(Ph(Bch)SiO_{2/2})_4$, $(Ph(Dcp)SiO_{2/2})_4$, $(Ph(Bch)SiO_{2/2})_3$, $(Ph(Dcp)SiO_{2/2})_3$, $(PhViSiO_{2/2})_3$, $(PhViSiO_{2/2})_4$ or $(PhViSiO_{2/2})_5$, wherein Me is methyl, Vi is vinyl, Bch is bicycloheptenyl, Dcp is 3a,4,5,6,7,7a-hexahydro-4,7-methano-1H-indenyl and Ph is phenyl.

5. The composition of claim 1, wherein the coupler comprises 4,4'-bis[dimethylsilyl]biphenyl.

6. The composition of claim 1, wherein the composition comprises:
(A1) cyclotrisiloxanes,
(B) coupler,
(C) catalyst,
optionally (D) inhibitor,
optionally (E) additives and
optionally (F) solvent.

7. The composition of claim 1, wherein the composition comprises:
(A2) aromatic cyclosiloxanes,
(B) coupler,
(C) catalyst,
optionally (D) inhibitor,
optionally (E) additives and
optionally (F) solvent.

8. A process for producing a composition of claim 1, comprising mixing the individual components.

9. A molded article produced by crosslinking a composition of claim 1.

10. The molded article of claim 9, wherein the molded article has an elastic modulus of greater than 0.70 GPa measured at 23° C.

11. The composition of claim 1, wherein cyclosiloxanes A comprise a mixture of 1,3,5-trivinyl-1,3,5-triphenyl-cyclotrisiloxane and 1,3,5,7-tetravinyl-1,3,5,7-tetraphenyl-cyclotetrasiloxane.

12. The composition of claim 1, which when cured to produce a molded article, has a flexural elastic modulus greater than 1.4 GPa.

13. The composition of claim 1, which when cured to produce a molded article, has a flexural strength of more than 50 MPa.

14. The composition of claim 12, which when cured to produce a molded article, has a flexural strength of more than 50 MPa.

* * * * *